(12) United States Patent
Sjostrom et al.

(10) Patent No.: US 11,203,407 B2
(45) Date of Patent: Dec. 21, 2021

(54) FLOOR GRID FOR AIRCRAFT

(71) Applicant: The Boeing Company, Chicago, IL (US)

(72) Inventors: Brett Dayton Sjostrom, Seattle, WA (US); Jose A. Cantos, Seattle, WA (US)

(73) Assignee: The Boeing Company, Chicago, IL (US)

( * ) Notice: Subject to any disclaimer, the term of this patent is extended or adjusted under 35 U.S.C. 154(b) by 181 days.

(21) Appl. No.: 16/732,384

(22) Filed: Jan. 2, 2020

(65) Prior Publication Data

US 2021/0206467 A1    Jul. 8, 2021

(51) Int. Cl.
*B64C 1/18* (2006.01)
*B64D 11/06* (2006.01)
*B64D 11/00* (2006.01)

(52) U.S. Cl.
CPC ............ *B64C 1/18* (2013.01); *B64D 11/0696* (2013.01); *B64D 2011/0046* (2013.01)

(58) Field of Classification Search
CPC ...... B64C 1/18; B64C 1/20; B64D 2011/0046
See application file for complete search history.

(56) References Cited

U.S. PATENT DOCUMENTS

| | | | | |
|---|---|---|---|---|
| 2008/0217478 A1* | 9/2008 | Keeler | ...................... | B64C 1/18 244/119 |
| 2009/0236472 A1* | 9/2009 | Wood | ........................ | B64C 1/18 244/119 |
| 2009/0321569 A1* | 12/2009 | Schroeer | ................. | B64C 1/061 244/119 |
| 2010/0320327 A1* | 12/2010 | Sayilgan | ................. | B64C 1/406 244/131 |
| 2011/0315821 A1* | 12/2011 | Siboni | ....................... | B64C 1/18 244/119 |
| 2012/0061513 A1* | 3/2012 | Gallant | ..................... | B64C 1/18 244/119 |
| 2013/0092793 A1* | 4/2013 | Braeutigam | .............. | B64C 1/18 244/131 |
| 2016/0129986 A1* | 5/2016 | Anast | ...................... | B64C 1/069 244/119 |

* cited by examiner

*Primary Examiner* — Philip J Bonzell
*Assistant Examiner* — Tye William Abell
(74) *Attorney, Agent, or Firm* — Mcdonnell Boehnen Hulbert & Berghoff LLP (57) ABSTRACT

A floor grid includes an outboard member, a first seat track and a second seat track, a first member extending from the outboard member to the first seat track, a second member extending from the first seat track to the second seat track, a first stanchion extending from the outboard member to the first seat track, a second stanchion extending from the outboard member to the second seat track, a third seat track and a fourth seat track, an intercostal extending from the second seat track to the fourth seat track, a third member extending from the outboard member to the third seat track, a fourth member extending from the third seat track to the fourth seat track, a third stanchion extending from the outboard member to the third seat track, and a fourth stanchion extending from the outboard member to the fourth seat track.

20 Claims, 13 Drawing Sheets

FLOOR GRID FOR AIRCRAFT

FIELD

The present disclosure generally relates to floor grids, and more specifically to floor grids for aircraft.

BACKGROUND

A floor grid for an aircraft typically includes several structural members (e.g., beams) that are connected together to support a floor of the cabin as well as absorb or transfer loads that occur during takeoff, cruising, and landing. Such loads may include forces applied to the floor grid that are related to landing and/or changes in cabin air pressure. Some floor grids are also designed to accommodate cargo containers that are placed below the floor grid within the fuselage. Some existing floor grids are too heavy and/or do not provide enough space to accommodate some cargo containers. Thus, a need exists for floor grids that can more efficiently transfer loads that occur during flight and that can better accommodate cargo containers below the floor grid.

SUMMARY

One aspect of the disclosure is a floor grid for an aircraft, the floor grid comprising: an outboard member; a first seat track and a second seat track, wherein the first seat track is outboard of the second seat track and substantially parallel to the second seat track; a first shear beam comprising: a first member extending from the outboard member to the first seat track; and a second member extending from the first seat track to the second seat track; a first stanchion extending from the outboard member to the first seat track; a second stanchion extending from the outboard member to the second seat track; a third seat track and a fourth seat track, wherein the third seat track is outboard of the fourth seat track and substantially parallel to the fourth seat track; an intercostal extending from the second seat track to the fourth seat track, wherein the outboard member is forward of the intercostal; a second shear beam comprising: a third member extending from the outboard member to the third seat track; and a fourth member extending from the third seat track to the fourth seat track; a third stanchion extending from the outboard member to the third seat track; and a fourth stanchion extending from the outboard member to the fourth seat track.

Another aspect of the disclosure is a floor grid for an aircraft, the floor grid comprising: an outboard member; a first seat track and a second seat track, wherein the first seat track is outboard of the second seat track and substantially parallel to the second seat track; a first shear beam comprising: a first member extending from the outboard member to the first seat track; and a second member extending from the first seat track to the second seat track, wherein the first shear beam intersects the first seat track at a first joint and intersects the second seat track at a second joint, wherein the first joint is forward of the second joint; a first stanchion extending from the outboard member to the first seat track; a second stanchion extending from the outboard member to the second seat track, wherein the first stanchion and the second stanchion intersect at the outboard member; a third seat track and a fourth seat track, wherein the third seat track is outboard of the fourth seat track and substantially parallel to the fourth seat track; an intercostal extending from the second seat track to the fourth seat track; a second shear beam comprising: a third member extending from the outboard member to the third seat track; and a fourth member extending from the third seat track to the fourth seat track; a third stanchion extending from the outboard member to the third seat track; and a fourth stanchion extending from the outboard member to the fourth seat track.

A further aspect of the disclosure is a floor grid for an aircraft, the floor grid comprising: an outboard member; a first seat track and a second seat track, wherein the first seat track is outboard of the second seat track; a first shear beam comprising: a first member extending from the outboard member to the first seat track; and a second member extending from the first seat track to the second seat track; a first stanchion extending from the outboard member to the first seat track; a second stanchion extending from the outboard member to the second seat track; a third seat track and a fourth seat track, wherein the third seat track is outboard of the fourth seat track; an intercostal extending from the second seat track to the fourth seat track, wherein the outboard member is forward of the intercostal, and wherein the first stanchion meets the first seat track at a first joint that is forward of the intercostal; a second shear beam comprising: a third member extending from the outboard member to the third seat track; and a fourth member extending from the third seat track to the fourth seat track; a third stanchion extending from the outboard member to the third seat track, wherein the third stanchion meets the third seat track at a second joint that is forward of the intercostal; and a fourth stanchion extending from the outboard member to the fourth seat track.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

As discussed above, there exists a need for floor grids that can more efficiently transfer loads that occur during flight and that can better accommodate cargo containers below the floor grid. Within examples, a floor grid includes an outboard member, a first seat track, and a second seat track. The first seat track is outboard of the second seat track and substantially parallel to the second seat track. The floor grid also includes a first shear beam that includes a first member extending from the outboard member to the first seat track and a second member extending from the first seat track to the second seat track. The floor grid also includes a first stanchion extending from the outboard member to the first seat track and a second stanchion extending from the outboard member to the second seat track. The floor grid also includes a third seat track and a fourth seat track. The third seat track is outboard of the fourth seat track and substantially parallel to the fourth seat track. The floor grid also includes an intercostal extending from the second seat track to the fourth seat track, with the outboard member being forward of the intercostal. The floor grid also includes a second shear beam that includes a third member extending from the outboard member to the third seat track and a fourth member extending from the third seat track to the fourth seat track. The floor grid also includes a third stanchion extending from the outboard member to the third seat track and a fourth stanchion extending from the outboard member to the fourth seat track.

The aforementioned floor grid can be advantageous when compared to conventional floor grids because the aforementioned floor grids can more efficiently transfer loads that occur during flight and better accommodate cargo containers below the floor grid.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Figure 1A:
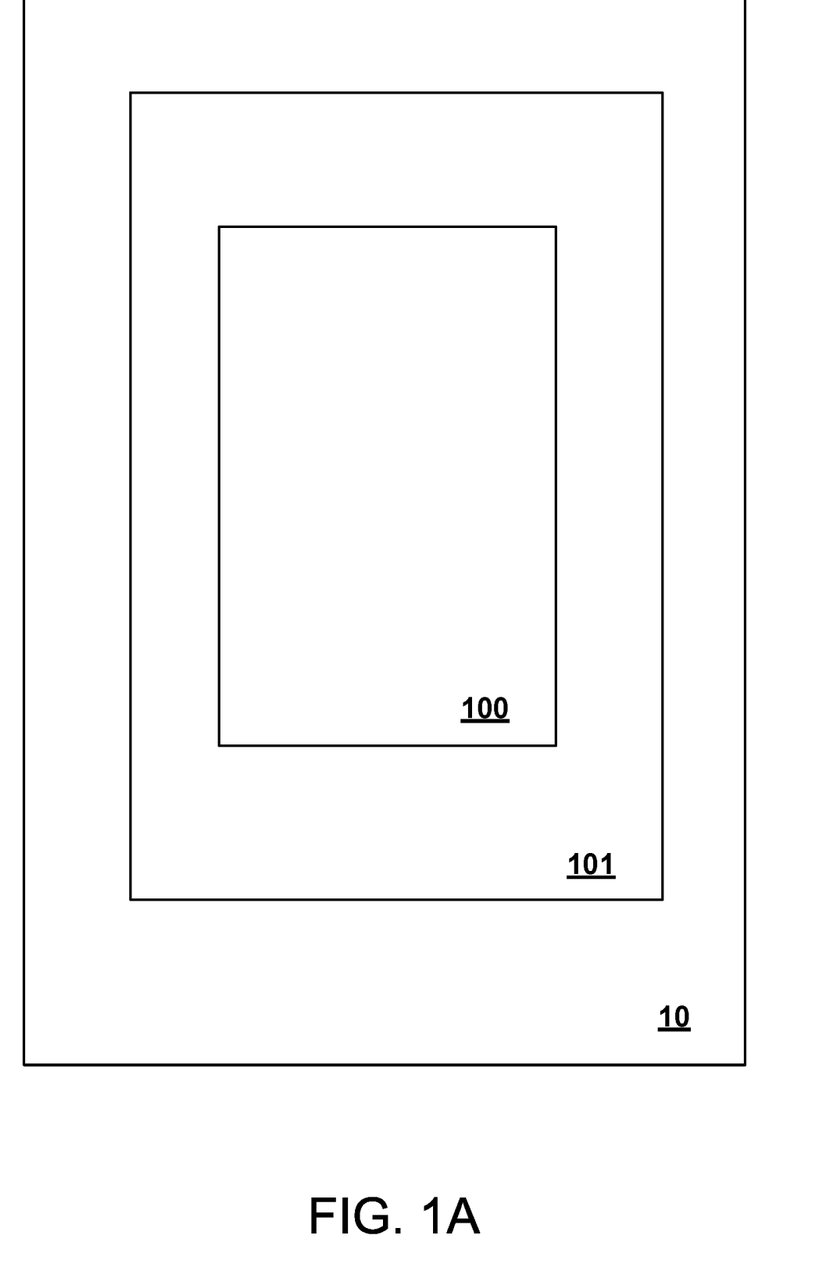
FIG. 1A is a schematic block diagram of an aircraft, according to an example.

FIG. 1A is a schematic block diagram of an aircraft 10 that includes a floor grid 100. The aircraft 10 could take the form of a commercial airliner, but other examples are possible. The aircraft 10 also includes an exterior skin 101 to which the floor grid 100 is attached.

Figure 1B:
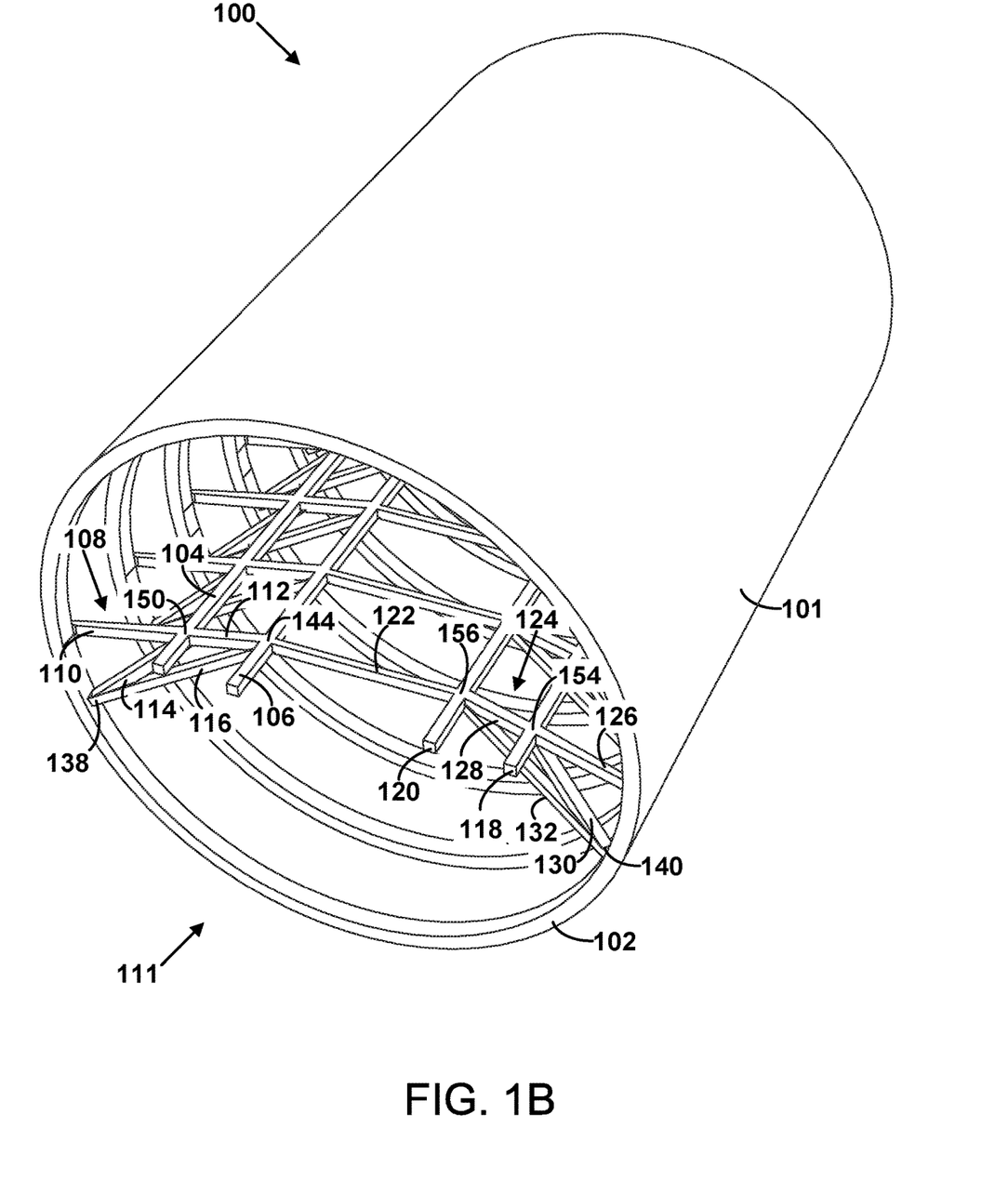
FIG. 1B is a perspective view of an aircraft skin and a floor grid from above and from the right, according to an example.

FIG. 1B is a perspective view of the exterior skin 101 and the floor grid 100 from above and from the right. The floor grid 100 (e.g., outboard members 102) can be welded or otherwise attached directly or indirectly to an inner surface of the exterior skin 101 that surrounds the floor grid 100.

Figure 1C:
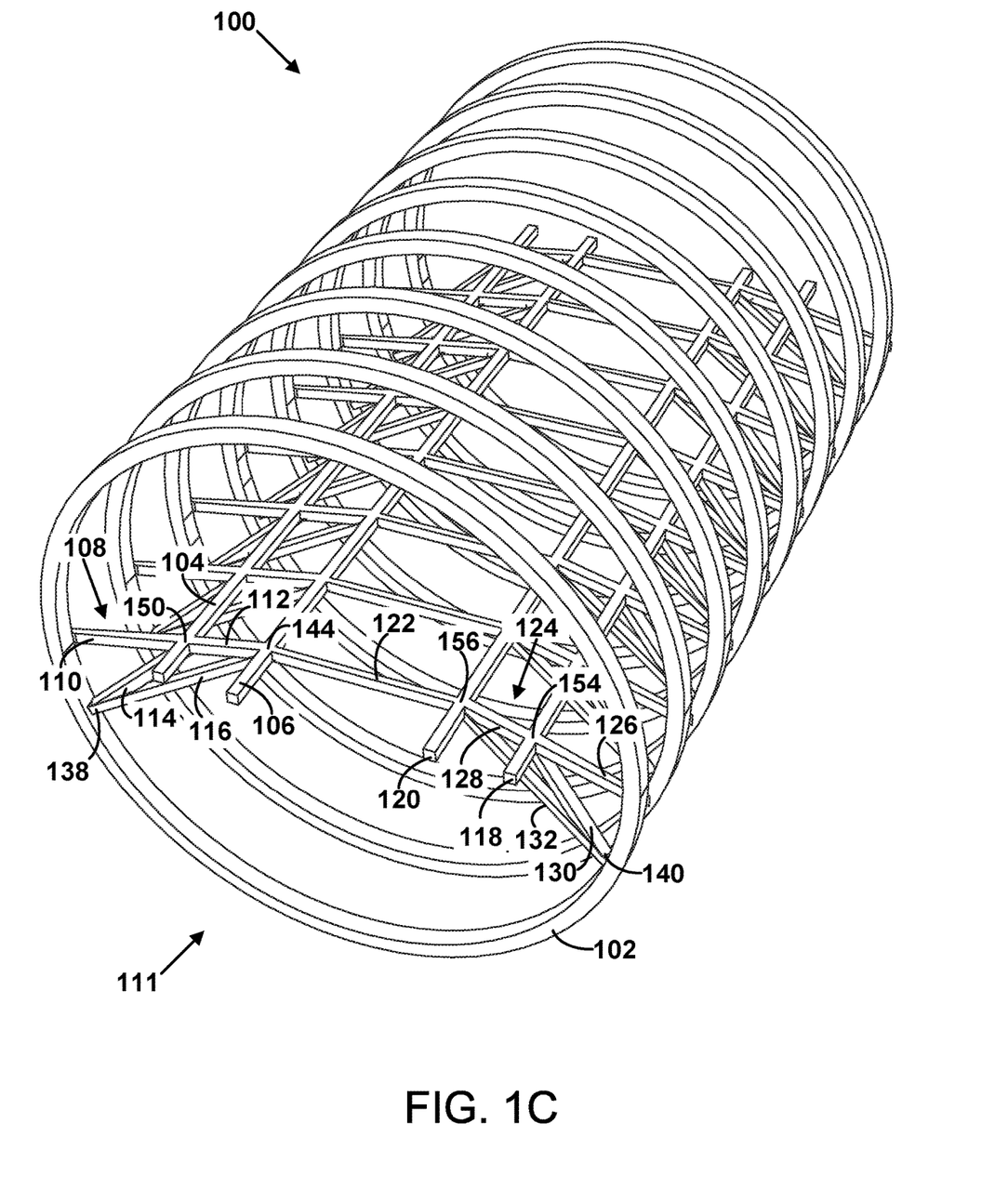
FIG. 1C is a perspective view of a floor grid from above and from the right, according to an example.

FIG. 1C is a perspective view of the floor grid 100 from above and from the right and front. The floor grid 100 includes the outboard member 102, a first seat track 104, and a second seat track 106. The first seat track 104 is outboard of the second seat track 106 and substantially parallel to the second seat track 106. The floor grid 100 also includes a first shear beam 108 that includes a first member 110 extending from the outboard member 102 to the first seat track 104 and a second member 112 extending from the first seat track 104 to the second seat track 106. The floor grid 100 also includes a first stanchion 114 extending from the outboard member 102 to the first seat track 104 and a second stanchion 116 extending from the outboard member 102 to the second seat track 106. The floor grid 100 also includes a third seat track 118 and a fourth seat track 120, with the third seat track 118 being outboard of the fourth seat track 120 and substantially parallel to the fourth seat track 120. The floor grid 100 also includes an intercostal 122 extending from the second seat track 106 to the fourth seat track 120, with the outboard member 102 being forward of the intercostal 122. The floor grid 100 also includes a second shear beam 124 that includes a third member 126 extending from the outboard member 102 to the third seat track 118 and a fourth member 128 extending from the third seat track 118 to the fourth seat track 120. The floor grid 100 also includes a third stanchion 130 extending from the outboard member 102 to the third seat track 118 and a fourth stanchion 132 extending from the outboard member 102 to the fourth seat track 120.

As used herein, a first component "extending from" a second component to a third component can mean that the first component spans between the second component and the third component and that the first component is connected or attached directly or indirectly to the second component and the third component at opposite ends of the first component. Other examples are possible.

Additionally, a first component being "attached to" or "connected to" a second component can mean that the first component is directly or indirectly attached or connected to the second component via a weld joint or via fasteners and/or brackets, for example. Additionally or alternatively, the first component being "attached to" or "connected to" the second component can mean that the first component meets the second component at a bracketed or welded joint (e.g., end-to-end, mid-section to end, or mid-section to mid-section). Other examples are possible.

As shown in FIG. 1C, the outboard member 102, a portion of the first seat track 104, a portion of the second seat track 106, the first shear beam 108, the first stanchion 114, the second stanchion 116, a portion of the third seat track 118, a portion of the fourth seat track 120, the intercostal 122, the second shear beam 124, the third stanchion 130, and the fourth stanchion 132 form a unit cell 111 of a larger floor grid structure. Several unit cells can be connected together via the first seat track 104, the second seat track 106, the third seat track 118, and/or the fourth seat track 120. In this way, the larger floor grid structure can be designed to have a particular desired length (e.g., an integer multiple of a length of the unit cell 111).

Passenger seats can be connected to the seat tracks with varying ranges of seat pitches (e.g., 28" or greater). The seat tracks can be used to create different seat configurations, such as business class or economy class. For example, a first set of three seats could be collectively connected to both the first seat track 104 and the second seat track 106 via two leg attachments and a second set of three seats could be collectively connected to both the third seat track 118 and the fourth seat track 120 via two additional leg attachments. As such, the first set of three seats and the second set of three seats could form a row (e.g., of many rows) of seats with an aisle that extends longitudinally between the sets of seats.

Figure 10:
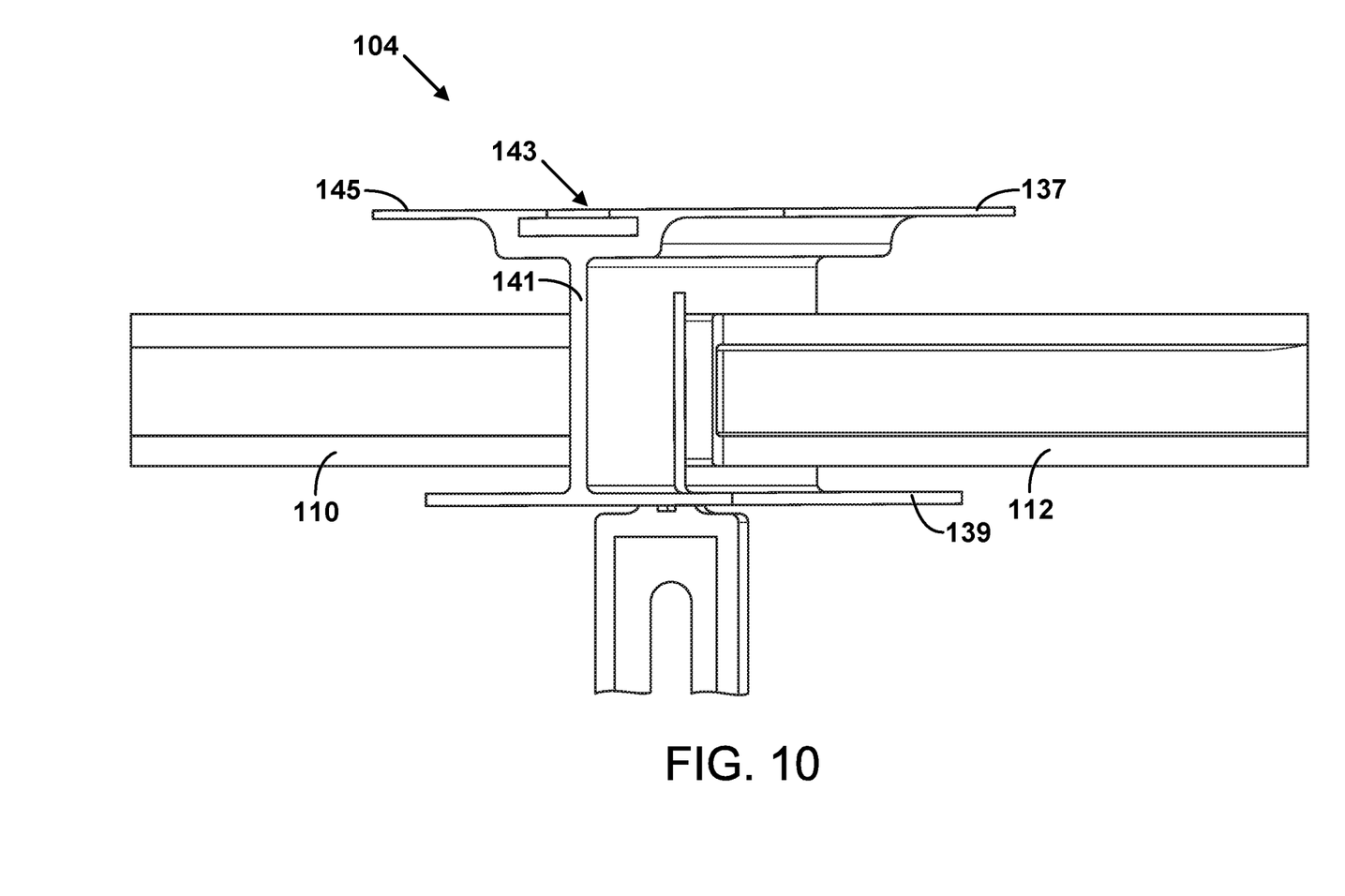
FIG. 10 is a schematic view of a seat track, according to an example.
Figure 11:
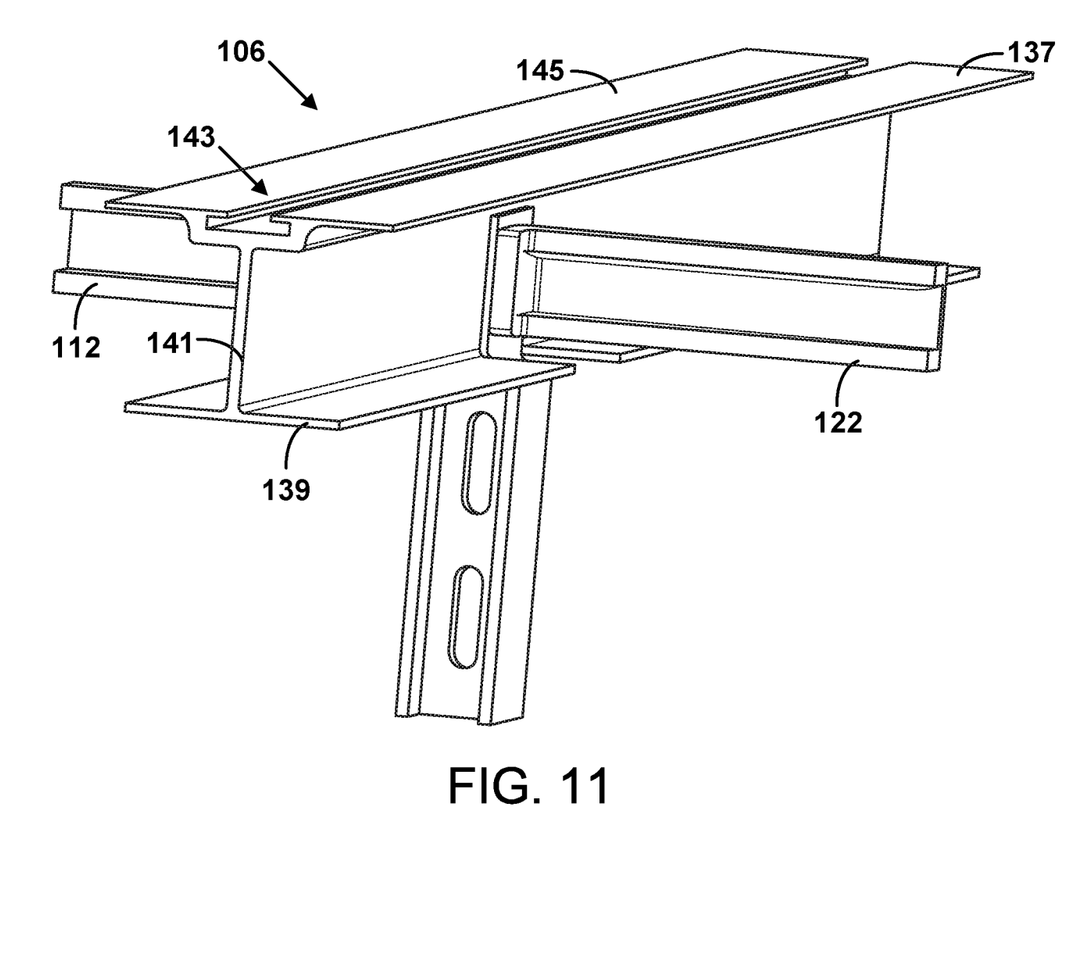
FIG. 11 is a schematic view of a seat track, according to an example.

Alternatively, a first seat could be connected to both the first seat track 104 and the second seat track 106 via two respective leg attachments and a second seat could be connected to both the third seat track 118 and the fourth seat track 120 via two respective leg attachments. More detail regarding the connectivity of the seat tracks is shown in FIG. 10 and FIG. 11 and discussed below.

The seat tracks can allow the position of each row of seats to be adjustable forward and aft in increments of 1 inch, for example. The longitudinal spacing of the intercostals 122 (e.g., the unit cells 111) is typically not correlated with the seating pitch. However, the aisle between seats typically extends longitudinally over the intercostals 122.

Any or all of the structural components recited above with reference to FIG. 1C can take the form of a beam, a strut, a rod, or other structural components. The aforementioned structural components can be formed of metal (e.g., steel), but other stiffened and/or hardened materials are possible. The aforementioned structural components can be welded together as shown in FIG. 1C and can be solid or partially hollow. Additionally or alternatively, the aforementioned structural components can be connected together via fasteners (e.g., bolts) and/or brackets. Other examples are possible.

Accordingly, the outboard member 102 is connected to the first stanchion 114, the second stanchion 116, the first member 110, the third member 126, the third stanchion 130, and the fourth stanchion 132. The outboard member 102 has a substantially circular shape and is positioned radially outward with respect to the first seat track 104, the third seat track 118, the first shear beam 108, the first stanchion 114, the second stanchion 116, the intercostal 122, the second shear beam 124, the third stanchion 130, and the fourth stanchion 132. The substantially circular shape of the outboard member(s) 102 can help the floor grid 100 conform for attachment to the shape of the exterior skin 101.

The first seat track 104 is connected to the first member 110, the second member 112, and the first stanchion 114. The first seat track 104 is also connected to a first shear beam of a unit cell (e.g., between a first member and a second member of a first shear beam) directly behind the unit cell 111.

The second seat track 106 is connected to the second member 112, the intercostal 122, and the second stanchion 116. The second seat track 106 is also connected to a first shear beam, an intercostal, and a second stanchion of a unit cell directly behind the unit cell 111.

As used herein, a first component "intersecting" a second component can mean that the first component and the second component meet at a bracketed or welded joint, for example. Such an intersection of components could occur end-to-end, mid-section to end, or mid-section to mid-section.

The first shear beam 108 intersects the first seat track 104 at a joint 150 and intersects the second seat track at a joint 144. The joint 150 is forward of the joint 144. The first member 110 is connected to the outboard member 102, the first seat track 104, and the first stanchion 114. The second member 112 is connected to the first member 110, the first seat track 104, the first stanchion 114, the second seat track 106, the second stanchion 116, and the intercostal 122.

The first stanchion 114 is connected to the outboard member 102, the first member 110, the first seat track 104, and the second member 112. The first stanchion 114 meets the first seat track 104 at the joint 150 that is forward of the intercostal 122.

The second stanchion 116 is connected to the outboard member 102, the second member 112, the second seat track 106, and the intercostal 122.

The first stanchion 114 and the second stanchion 116 intersect at a joint 138 on the outboard member 102. The joint 138 is below the first shear beam 108. The first stanchion 114 and the second stanchion 116 each extend between the outboard member 102 and the first shear beam 108.

The third seat track 118 is connected to the third member 126, the fourth member 128, and the third stanchion 130. The third seat track 118 is also connected to a second shear beam of a unit cell directly behind the unit cell 111.

The fourth seat track 120 is connected to the fourth member 128, the intercostal 122, and the fourth stanchion 132. The fourth seat track 120 is also connected to a second shear beam and an intercostal of a unit cell directly behind the unit cell 111.

The intercostal 122 is connected to the second seat track 106, the second member 112, the second stanchion 116, the fourth seat track 120, the fourth member 128, and the fourth stanchion 132. The intercostal 122 is substantially parallel with the outboard member 102.

The second shear beam 124 intersects the third seat track 118 at the joint 154 and intersects the fourth seat track 120 at a joint 156. The joint 154 is forward of the joint 156. The third member 126 is connected to the outboard member 102, the third seat track 118, and the third stanchion 130. The fourth member 128 is connected to the third member 126, the third seat track 118, the third stanchion 130, the fourth seat track 120, the fourth stanchion 132, and the intercostal 122.

The third stanchion 130 is connected to the outboard member 102, the third member 126, the third seat track 118, and the fourth member 128. The third stanchion 130 meets the third seat track 118 at a joint 154 that is forward of the intercostal 122.

The fourth stanchion 132 is connected to the outboard member 102, the fourth member 128, the fourth seat track 120, and the intercostal 122. The fourth stanchion 132 intersects the intercostal 122 and the second shear beam 124.

The third stanchion 130 and the fourth stanchion 132 intersect at a joint 140 on the outboard member 102. The joint 140 is below the second shear beam 124. The third stanchion 130 and the fourth stanchion 132 each extend between the outboard member 102 and the second shear beam 124.

The first stanchion 114, the second stanchion 116, the third stanchion 130, and the fourth stanchion 132 (e.g., the forward canted stanchions) can aid in reducing a bending moment in the first shear beam 108, the second shear beam 124, the first seat track 104, the second seat track 106, the third seat track 118, the fourth seat track 120, and/or the intercostal 122 in the event of a change of cabin pressure. The forward canted stanchions can accommodate a LD3-45W cargo container (or other containers) and to support the seat tracks. The stanchions are canted forward (e.g., at an angle within a range of 10 degrees to 25 degrees with respect to the intercostal 122, such as 15 degrees) such that they can be in tension during landing. The forward cant of the stanchions can allow additional load to transfer through the stanchions into a skin of the aircraft. The stanchions can help to reduce bending moments in other structural components, which can facilitate reducing the length of the intercostal 122. This reduced length can allow for either a reduced floor volume or an increase in systems routing volume. The stanchions also provide additional systems routing attachment locations.

The shear beams add both shear elements for loading during landing and beam elements for loading during a change in cabin pressure. This configuration allows the structural material to be utilized for both load cases, which can reduce the weight of the floor grid. The shear beams can be canted at 15 degrees with respect to the intercostal 122. Other angles are possible as well, such as between about 10 degrees to about 25 degrees.

Figure 2:
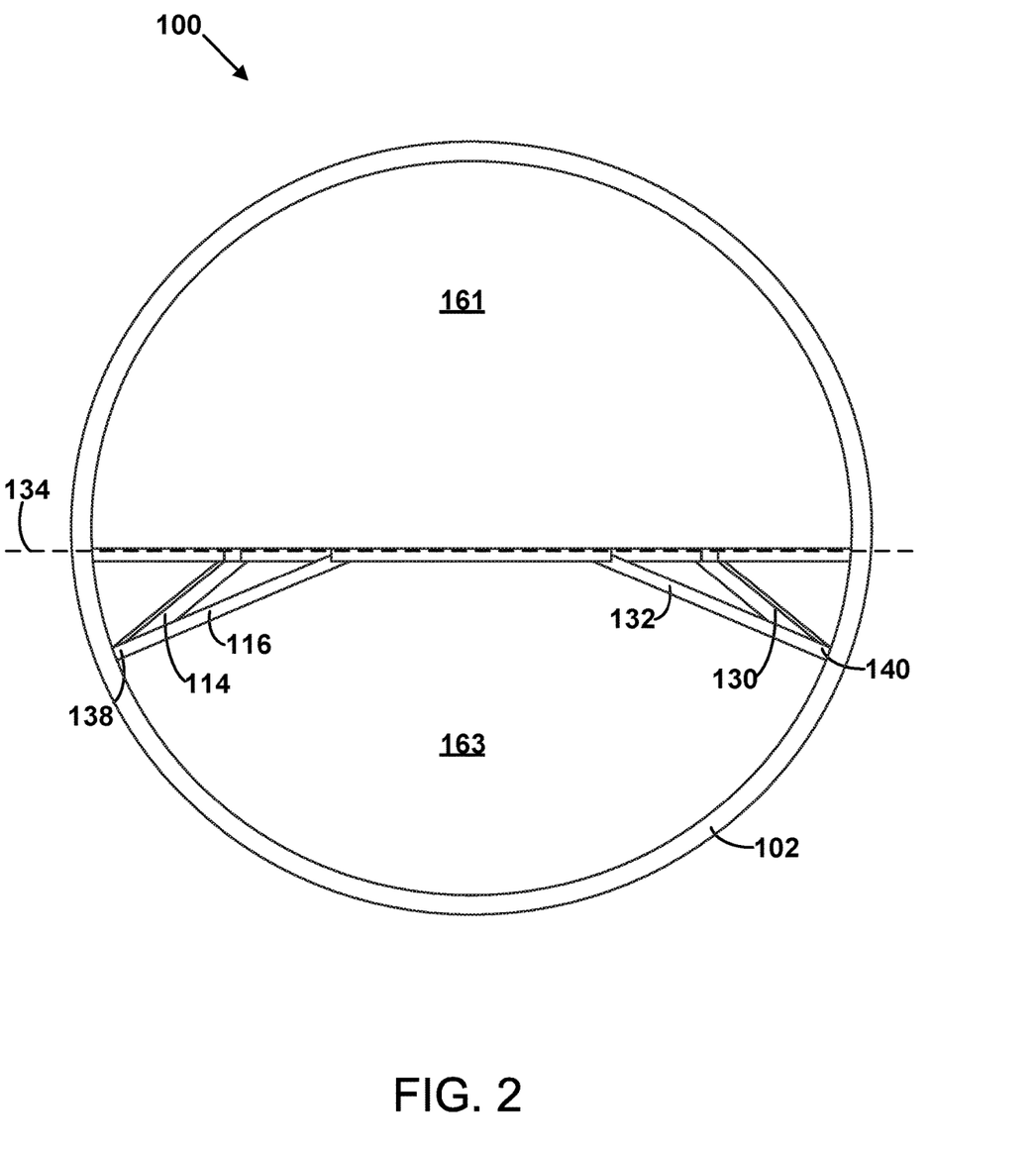
FIG. 2 is an orthographic front view of a floor grid, according to an example.

FIG. 2 is an orthographic front view of the floor grid 100. The first seat track, the second seat track, the third seat track, the fourth seat track, the first shear beam, the second shear beam, and the intercostal are substantially coplanar and define a floor plane 134. The floor plane 134 defines a boundary between a passenger area 161 above the floor plane 134 and a cargo area 163 below the floor plane 134.

Figure 3:
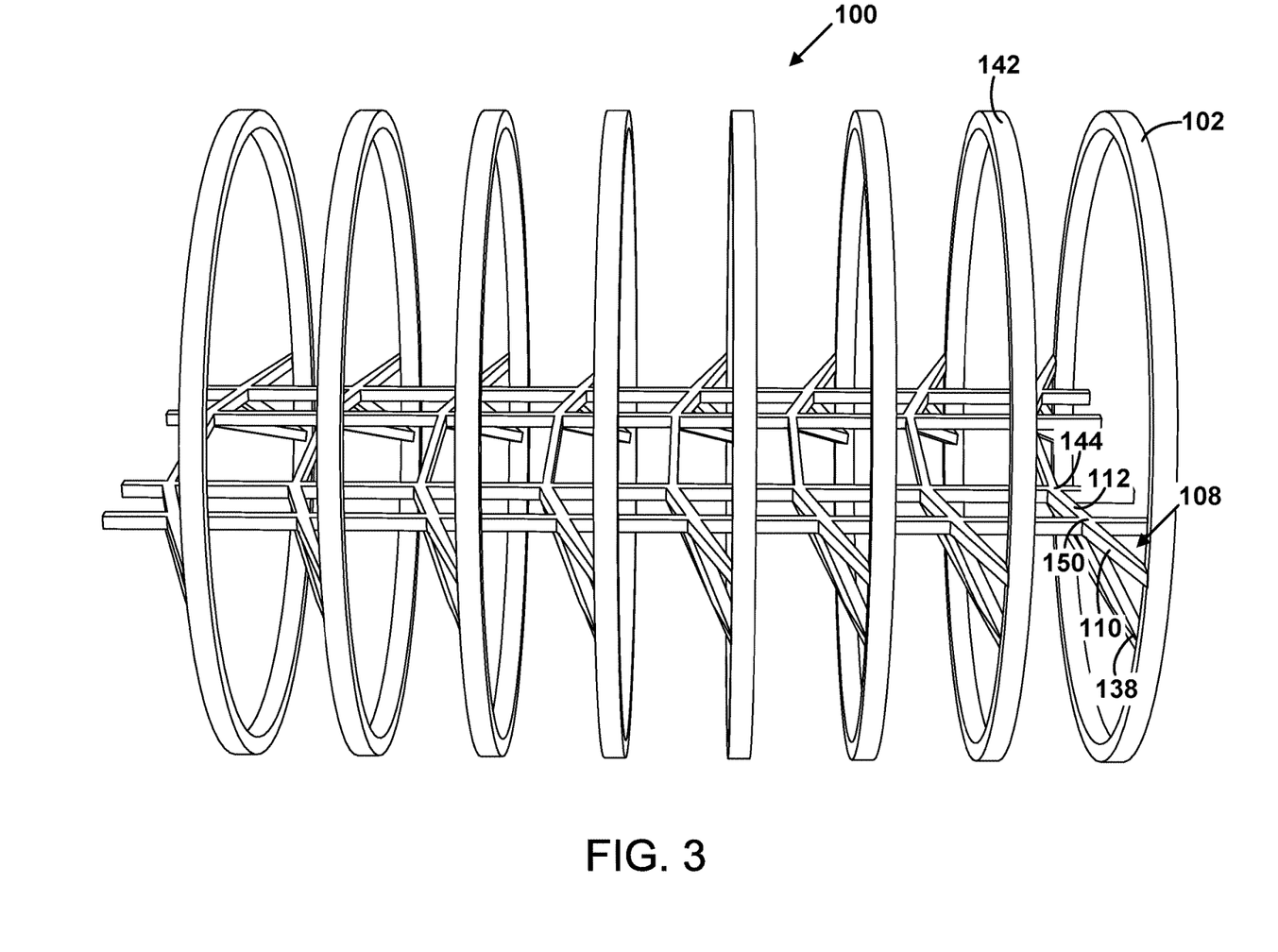
FIG. 3 is a left side perspective view of a floor grid, according to an example.

FIG. 3 is a left side perspective view of the floor grid 100. The floor grid 100 includes an outboard member 142 that is aft of the outboard member 102. The first shear beam 108 intersects the second seat track at the joint 144.

Figure 4:
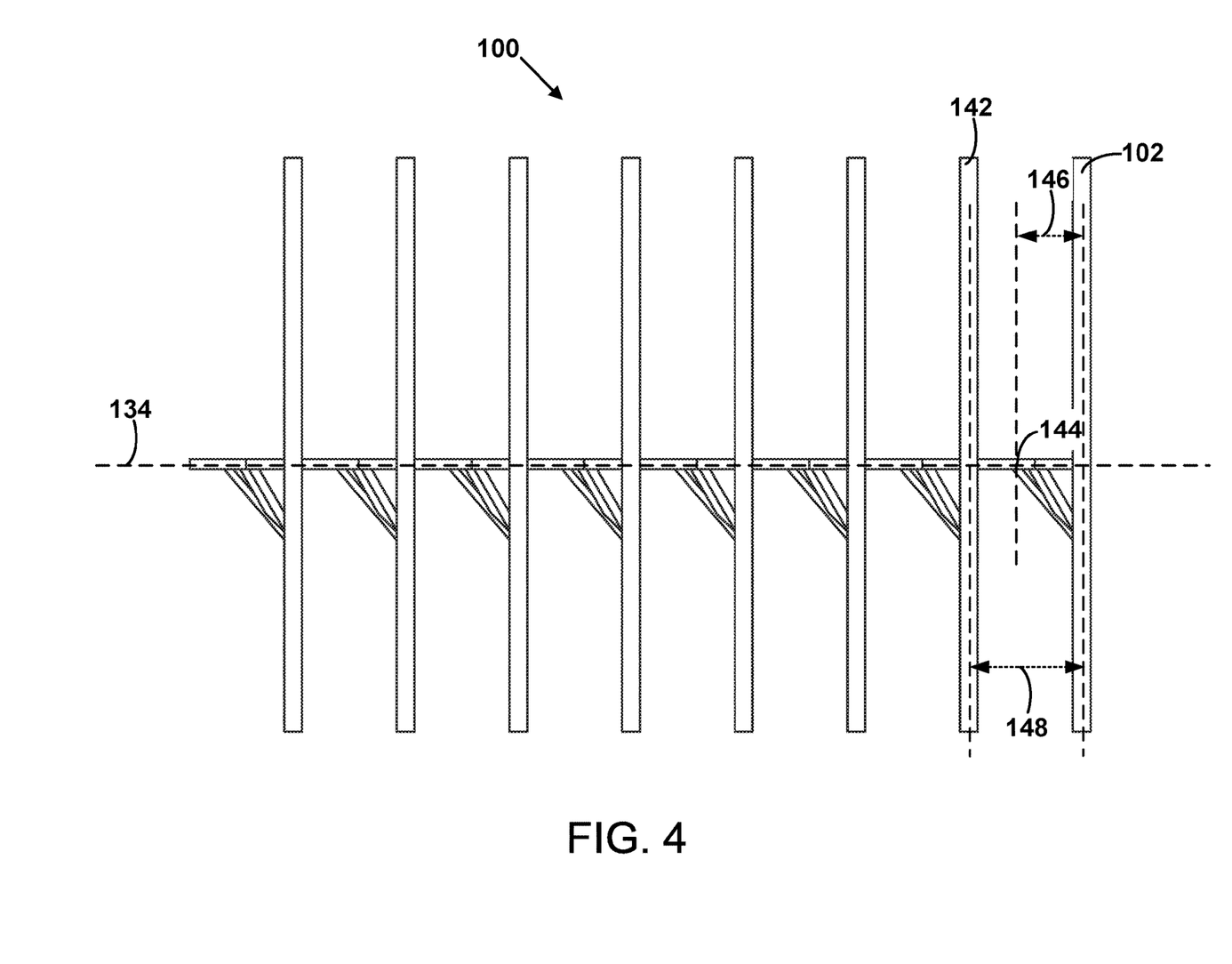
FIG. 4 is a left side orthographic view of a floor grid, according to an example.

FIG. 4 is a left side orthographic view of the floor grid 100. A longitudinal distance 146 between the outboard member 102 and the joint 144 is 40 to 60 percent of a longitudinal distance 148 between the outboard member 102 and the outboard member 142.

Figure 5:
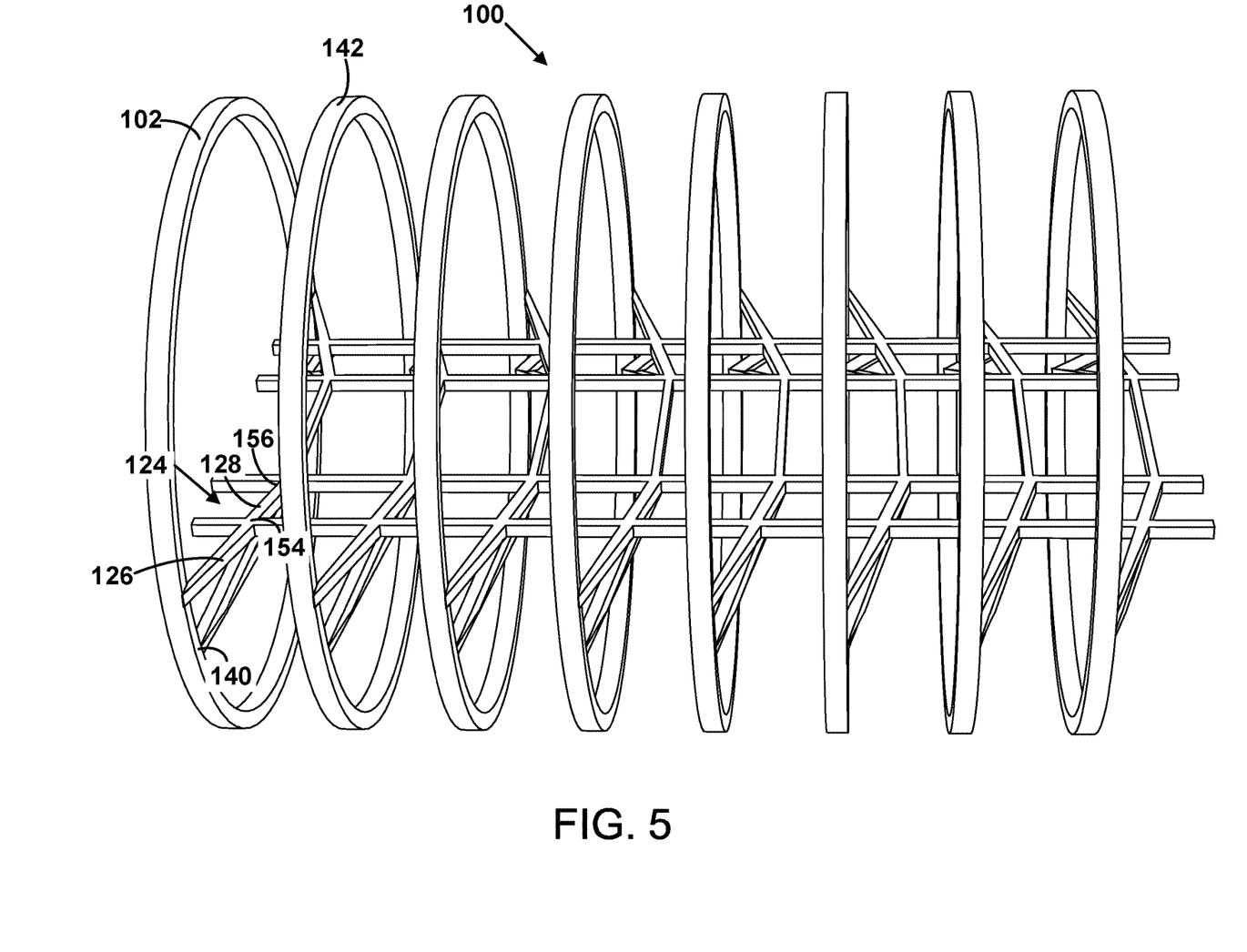
FIG. 5 is a right side perspective view of a floor grid, according to an example.

FIG. 5 is a right side perspective view of the floor grid 100. The second shear beam 124 intersects the second seat track at the joint 156.

Figure 6:
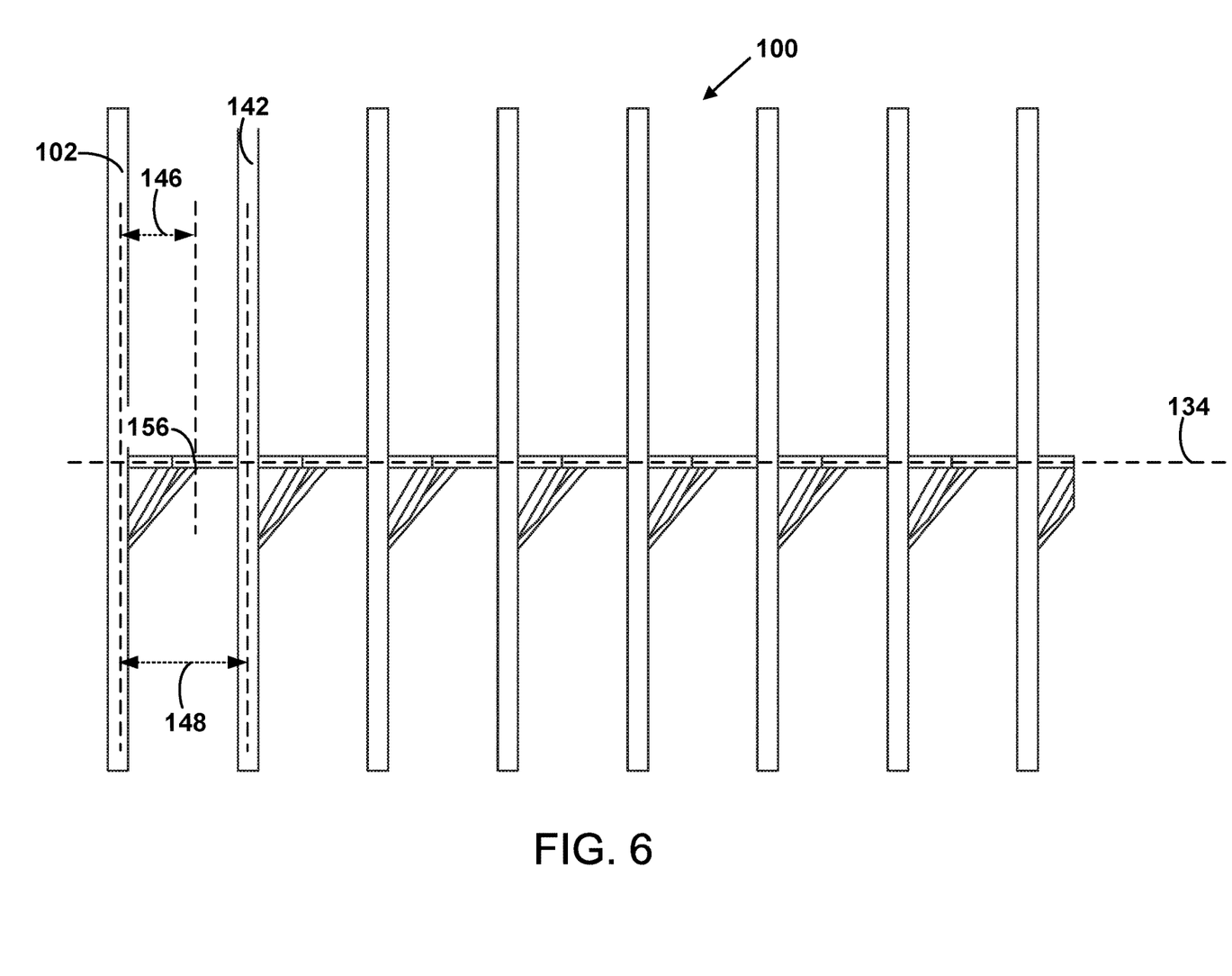
FIG. 6 is a right side orthographic view of a floor grid, according to an example.

FIG. 6 is a right side orthographic view of the floor grid 100. The longitudinal distance 146 between the outboard member 102 and the joint 156 is 40 to 60 percent of the longitudinal distance 148 between the outboard member 102 and the outboard member 142.

Figure 7:
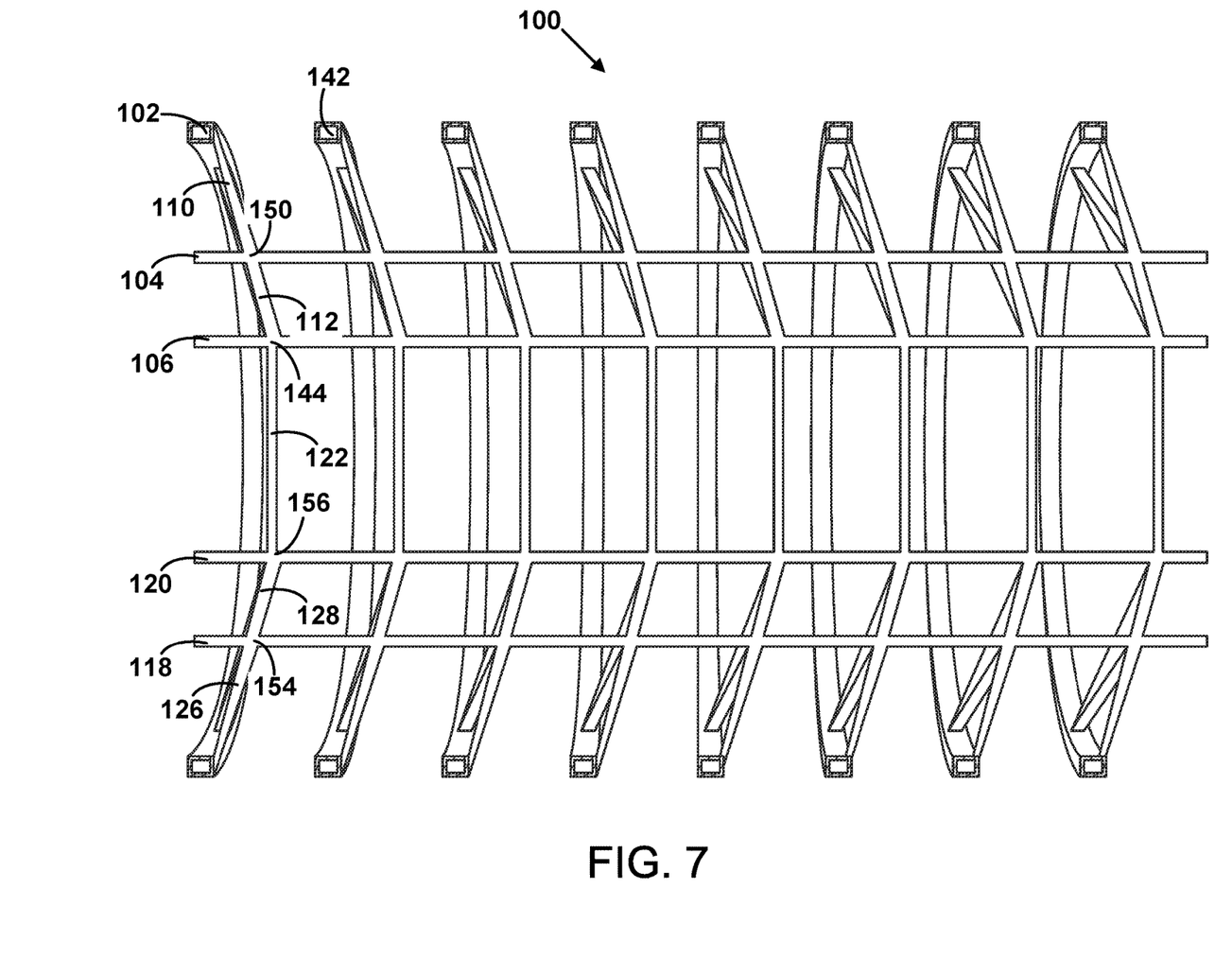
FIG. 7 is a downward cross sectional view of a floor grid, according to an example.

FIG. 7 is a downward cross sectional view of the floor grid 100.

Figure 8:
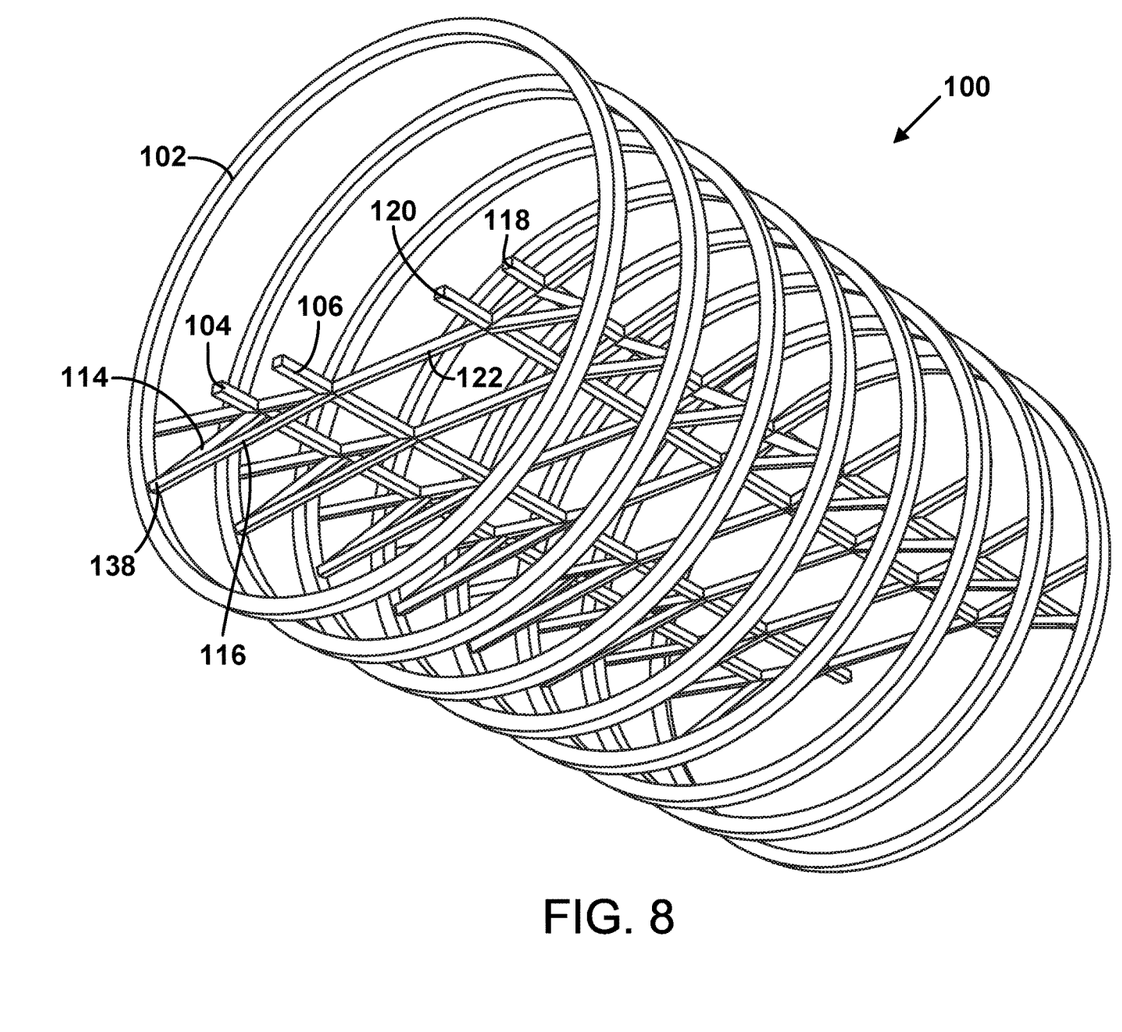
FIG. 8 is a perspective view of a floor grid from below and from the right, according to an example.

FIG. 8 is a perspective view of the floor grid from below and from the right and front.

Figure 9:
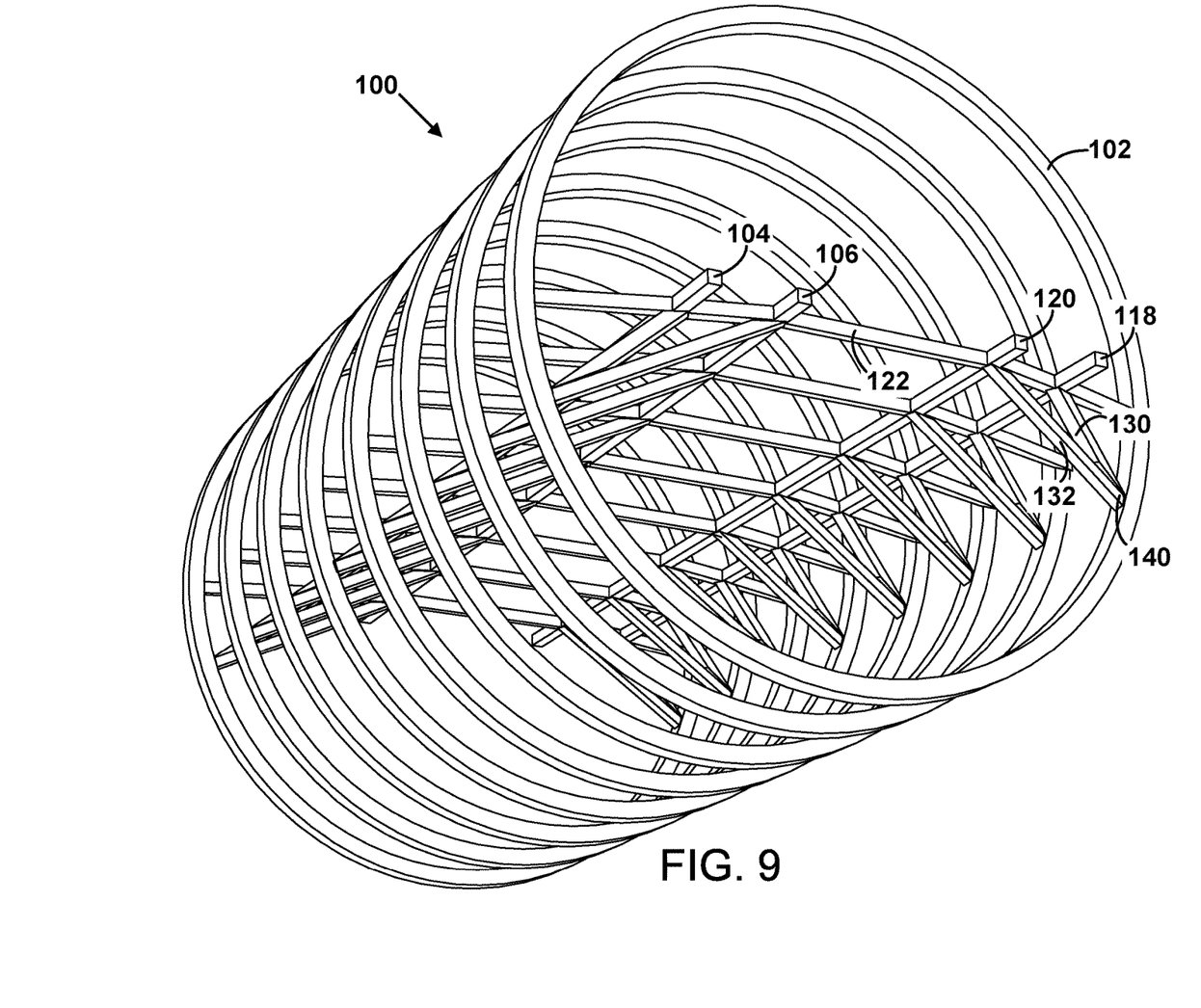
FIG. 9 is a perspective view of a floor grid from below and from the left, according to an example.

FIG. 9 is a perspective view of the floor grid 100 from below and from the left and front.

FIG. 10 is a schematic perspective view of a seat track, such as the first seat track 104, the second seat track 106, the third seat track 118, or the fourth seat track 120. As an example, the first seat track 104 is shown in FIG. 10. The first seat track 104, the second seat track 106, the third seat track 118, or the fourth seat track 120 can have an I-beam structure that includes a top flange portion 137, a top flange portion 145, a bottom flange 139, a slot 143, and a web 141. The I-beam structure can provide a high strength-to-weight ratio for the seat tracks. The slot 143 is configured to receive a leg attachment corresponding to one or more passenger seats such that seats can be attached to the seat track. Also shown in FIG. 10 are the first member 110 and the second member 112.

FIG. 11 is a schematic perspective view of the second seat track 106, including a top flange portion 137, a top flange portion 145, a bottom flange 139, a slot 143, and a web 141. The slot 143 is configured to receive a leg attachment corresponding to one or more passenger seats such that seats can be attached to the seat track. Also shown in FIG. 11 are the the second member 112 and the intercostal 122.

Examples of the present disclosure can thus relate to one of the enumerated clauses (ECs) listed below.

EC 1 is a floor grid for an aircraft, the floor grid comprising: an outboard member; a first seat track and a second seat track, wherein the first seat track is outboard of the second seat track and substantially parallel to the second seat track; a first shear beam comprising: a first member extending from the outboard member to the first seat track; and a second member extending from the first seat track to the second seat track; a first stanchion extending from the outboard member to the first seat track; a second stanchion extending from the outboard member to the second seat track; a third seat track and a fourth seat track, wherein the third seat track is outboard of the fourth seat track and substantially parallel to the fourth seat track; an intercostal extending from the second seat track to the fourth seat track, wherein the outboard member is forward of the intercostal; a second shear beam comprising: a third member extending from the outboard member to the third seat track; and a fourth member extending from the third seat track to the fourth seat track; a third stanchion extending from the outboard member to the third seat track; and a fourth stanchion extending from the outboard member to the fourth seat track.

EC 2 is the floor grid of EC 1, wherein the outboard member has a substantially circular shape and is positioned radially outward with respect to the first seat track, the third seat track, the first shear beam, the first stanchion, the second stanchion, the intercostal, the second shear beam, the third stanchion, and the fourth stanchion.

EC 3 is the floor grid of any of ECs 1-2, wherein the first seat track, the second seat track, the third seat track, the fourth seat track, the first shear beam, the second shear beam, and the intercostal are substantially coplanar and define a floor plane.

EC 4 is the floor grid of EC 3, wherein the first seat track or the second seat track has an I-beam structure.

EC 5 is the floor grid of any of ECs 1-4, wherein the first stanchion and the second stanchion intersect at a joint on the outboard member.

EC 6 is the floor grid of EC 5, wherein the joint is below the first shear beam.

EC 7 is the floor grid of any of ECs 5-6, wherein the third stanchion and the fourth stanchion intersect at a second joint on the outboard member.

EC 8 is the floor grid of EC 7, wherein the second joint is below the second shear beam.

EC 9 is the floor grid of any of ECs 1-8, wherein the intercostal is substantially parallel with the outboard member.

EC 10 is the floor grid of any of ECs 1-9, wherein the outboard member is a first outboard member, the floor grid further comprising a second outboard member that is aft of the first outboard member, wherein the first shear beam intersects the second seat track at a joint, and wherein a first longitudinal distance between the first outboard member and the joint is 40 to 60 percent of a second longitudinal distance between the first outboard member and the second outboard member.

EC 11 is the floor grid of any of ECs 1-10, wherein the first shear beam intersects the first seat track at a first joint and intersects the second seat track at a second joint, wherein the first joint is forward of the second joint.

EC 12 is the floor grid of EC 11, wherein the second shear beam intersects the third seat track at a third joint and intersects the fourth seat track at a fourth joint, wherein the third joint is forward of the fourth joint.

EC 13 is the floor grid of any of ECs 1-12, wherein the second stanchion intersects the intercostal and the first shear beam.

EC 14 is the floor grid of EC 13, wherein the fourth stanchion intersects the intercostal and the second shear beam.

EC 15 is the floor grid of any of ECs 1-14, wherein the first stanchion and the second stanchion each extend between the outboard member and the first shear beam.

EC 16 is the floor grid of EC 15, wherein the third stanchion and the fourth stanchion each extend between the outboard member and the second shear beam.

EC 17 is the floor grid of any of ECs 1-16, wherein the first stanchion meets the first seat track at a joint that is forward of the intercostal.

EC 18 is the floor grid of any of ECs 1-17, wherein the third stanchion meets the third seat track at a joint that is forward of the intercostal.

EC 19 is a floor grid for an aircraft, the floor grid comprising: an outboard member; a first seat track and a second seat track, wherein the first seat track is outboard of the second seat track and substantially parallel to the second seat track; a first shear beam comprising: a first member extending from the outboard member to the first seat track; and a second member extending from the first seat track to the second seat track, wherein the first shear beam intersects the first seat track at a first joint and intersects the second seat track at a second joint, wherein the first joint is forward of the second joint; a first stanchion extending from the outboard member to the first seat track; a second stanchion extending from the outboard member to the second seat track, wherein the first stanchion and the second stanchion intersect at the outboard member; a third seat track and a fourth seat track, wherein the third seat track is outboard of the fourth seat track and substantially parallel to the fourth seat track; an intercostal extending from the second seat track to the fourth seat track; a second shear beam comprising: a third member extending from the outboard member to the third seat track; and a fourth member extending from the third seat track to the fourth seat track; a third stanchion extending from the outboard member to the third seat track; and a fourth stanchion extending from the outboard member to the fourth seat track.

EC 20 is a floor grid for an aircraft, the floor grid comprising: an outboard member; a first seat track and a second seat track, wherein the first seat track is outboard of the second seat track; a first shear beam comprising: a first member extending from the outboard member to the first seat track; and a second member extending from the first seat track to the second seat track; a first stanchion extending from the outboard member to the first seat track; a second stanchion extending from the outboard member to the second seat track; a third seat track and a fourth seat track, wherein the third seat track is outboard of the fourth seat track; an intercostal extending from the second seat track to the fourth seat track, wherein the outboard member is forward of the intercostal, and wherein the first stanchion meets the first seat track at a first joint that is forward of the intercostal; a second shear beam comprising: a third member extending from the outboard member to the third seat track; and a fourth member extending from the third seat track to the fourth seat track; a third stanchion extending from the outboard member to the third seat track, wherein the third stanchion meets the third seat track at a second joint that is forward of the intercostal; and a fourth stanchion extending from the outboard member to the fourth seat track.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A floor grid for an aircraft, the floor grid comprising:
   an outboard member;
   a first seat track and a second seat track, wherein the first seat track is outboard of the second seat track and substantially parallel to the second seat track;
   a first shear beam comprising:
      a first member extending from the outboard member to the first seat track; and
      a second member extending from the first seat track to the second seat track;
   a first stanchion extending from the outboard member to the first seat track;
   a second stanchion extending from the outboard member to the second seat track;
   a third seat track and a fourth seat track, wherein the third seat track is outboard of the fourth seat track and substantially parallel to the fourth seat track;
   an intercostal extending from the second seat track to the fourth seat track, wherein the outboard member is forward of the intercostal;
   a second shear beam comprising:
      a third member extending from the outboard member to the third seat track; and
      a fourth member extending from the third seat track to the fourth seat track;
   a third stanchion extending from the outboard member to the third seat track; and
   a fourth stanchion extending from the outboard member to the fourth seat track.

2. The floor grid of claim 1, wherein the outboard member has a substantially circular shape and is positioned radially outward with respect to the first seat track, the third seat track, the first shear beam, the first stanchion, the second stanchion, the intercostal, the second shear beam, the third stanchion, and the fourth stanchion.

3. The floor grid of claim 1, wherein the intercostal is substantially parallel with the outboard member.

4. The floor grid of claim 1, wherein the outboard member is a first outboard member, the floor grid further comprising a second outboard member that is aft of the first outboard member, wherein the first shear beam intersects the second seat track at a joint, and wherein a first longitudinal distance between the first outboard member and the joint is 40 to 60 percent of a second longitudinal distance between the first outboard member and the second outboard member.

5. The floor grid of claim 1, wherein the first stanchion meets the first seat track at a joint that is forward of the intercostal.

6. The floor grid of claim 1, wherein the third stanchion meets the third seat track at a joint that is forward of the intercostal.

7. The floor grid of claim 1, wherein the first seat track, the second seat track, the third seat track, the fourth seat track, the first shear beam, the second shear beam, and the intercostal are substantially coplanar and define a floor plane.

8. The floor grid of claim 7, wherein the first seat track or the second seat track has an I-beam structure.

9. The floor grid of claim 1, wherein the first shear beam intersects the first seat track at a first joint and intersects the second seat track at a second joint, wherein the first joint is forward of the second joint.

10. The floor grid of claim 9, wherein the second shear beam intersects the third seat track at a third joint and intersects the fourth seat track at a fourth joint, wherein the third joint is forward of the fourth joint.

11. The floor grid of claim 1, wherein the second stanchion intersects the intercostal and the first shear beam.

12. The floor grid of claim 11, wherein the fourth stanchion intersects the intercostal and the second shear beam.

13. The floor grid of claim 1, wherein the first stanchion and the second stanchion each extend between the outboard member and the first shear beam.

14. The floor grid of claim 13, wherein the third stanchion and the fourth stanchion each extend between the outboard member and the second shear beam.

15. The floor grid of claim 1, wherein the first stanchion and the second stanchion intersect at a joint on the outboard member.

16. The floor grid of claim 15, wherein the joint is below the first shear beam.

17. The floor grid of claim 15, wherein the third stanchion and the fourth stanchion intersect at a second joint on the outboard member.

18. The floor grid of claim 17, wherein the second joint is below the second shear beam.

19. A floor grid for an aircraft, the floor grid comprising:
an outboard member;
a first seat track and a second seat track, wherein the first seat track is outboard of the second seat track and substantially parallel to the second seat track;
a first shear beam comprising:
a first member extending from the outboard member to the first seat track; and
a second member extending from the first seat track to the second seat track,
wherein the first shear beam intersects the first seat track at a first joint and intersects the second seat track at a second joint, wherein the first joint is forward of the second joint;
a first stanchion extending from the outboard member to the first seat track;
a second stanchion extending from the outboard member to the second seat track, wherein the first stanchion and the second stanchion intersect at the outboard member;
a third seat track and a fourth seat track, wherein the third seat track is outboard of the fourth seat track and substantially parallel to the fourth seat track;
an intercostal extending from the second seat track to the fourth seat track;
a second shear beam comprising:
a third member extending from the outboard member to the third seat track; and
a fourth member extending from the third seat track to the fourth seat track;
a third stanchion extending from the outboard member to the third seat track; and
a fourth stanchion extending from the outboard member to the fourth seat track.

20. A floor grid for an aircraft, the floor grid comprising:
an outboard member;
a first seat track and a second seat track, wherein the first seat track is outboard of the second seat track;
a first shear beam comprising:
a first member extending from the outboard member to the first seat track; and
a second member extending from the first seat track to the second seat track;
a first stanchion extending from the outboard member to the first seat track;
a second stanchion extending from the outboard member to the second seat track;
a third seat track and a fourth seat track, wherein the third seat track is outboard of the fourth seat track;
an intercostal extending from the second seat track to the fourth seat track, wherein the outboard member is forward of the intercostal, and wherein the first stanchion meets the first seat track at a first joint that is forward of the intercostal;
a second shear beam comprising:
a third member extending from the outboard member to the third seat track; and
a fourth member extending from the third seat track to the fourth seat track;
a third stanchion extending from the outboard member to the third seat track, wherein the third stanchion meets the third seat track at a second joint that is forward of the intercostal; and
a fourth stanchion extending from the outboard member to the fourth seat track.

* * * * *